United States Patent

[11] 3,573,824

[72] Inventors Graham M. Armstrong
Framingham;
Ralph J. Donaldson, Jr., Sudbury, Mass.
[21] Appl. No. 817,945
[22] Filed Apr. 21, 1969
[45] Patented Apr. 6, 1971
[73] Assignee The United States of America as represented by the Secretary of the Air Force

[54] WIND SHEAR AND TURBULENCE RADAR INDICATOR
2 Claims, 5 Drawing Figs.
[52] U.S. Cl. .................................................. 343/9, 343/5
[51] Int. Cl. .................................................. G01s 9/42, G01w 1/00
[50] Field of Search .................................... 343/5 (W), 8, 9

[56] References Cited
UNITED STATES PATENTS
3,193,825  7/1965  Lhermitte .................... 343/9
3,212,085 10/1965  Lhermitte et al. ............ 343/9

*Primary Examiner*—Rodney D. Bennett, Jr.
*Assistant Examiner*—T. H. Tubbesing
*Attorneys*—Harry A. Herbert, Jr. and George Fine ABSTRACT: A wind shear and turbulence radar indicator in which velocity information is obtained from a coherent memory filter and presented rapidly and conveniently on an intensity modulated PPI scope as the doppler radar antenna rotates in azimuth. Regions of wind shear and turbulence can be identified immediately by a characteristic signature on this display.

WIND SHEAR AND TURBULENCE RADAR INDICATOR

BACKGROUND OF THE INVENTION

This invention relates to a wind shear and turbulence indicator and more particularly a wind shear and turbulence indicator utilizing weather echoes generated by a pulse Doppler radar.

One of the difficulties in current meteorological use of Doppler radar is the inaccessibility of much of the information until it is processed and analyzed some days or even months after it has been acquired. Pertinent velocity data are generally not available for contribution to real-time decisions, such as severe storm warnings or selection of the most appropriate observational routine for research. The present invention permits real-time use of velocity information from weather echoes generated by a Doppler radar.

SUMMARY OF THE INVENTION

Velocity information is obtained from a coherent memory filter and presented rapidly and conveniently on an intensity-modulated PPI scope as the Doppler radar antenna rotates in azimuth. Regions of unusually large wind shear or turbulence can be identified immediately by a characteristic signature on this display. Ease of recognition of large shear at a high data rate is achieved by trading off the ability to measure wind components quantitatively. The system in use permits a complete azimuthal scan of the Doppler radar antenna in about 10 seconds. With an indicator large enough that intervals of $10^{13}$ scope diameter are clearly visible, this scheme will provide information on the occurrence of unusually large shear (or turbulence) at a rate of 7,600 pulse volumes per second.

The above-mentioned coherent memory filter may be an integral part of the receiver of a pulse Doppler radar. The aforementioned characteristic signature is in the form of a pattern which is a series of concentric arcs, each one located on the indicator at its appropriate range plus an increment dependent on the radial component of velocity measured at that range. Radial shear is indicated by gaps or bunching while tangential shear is indicated by wrinkles in the arcs. An increase in the line widths of the arcs marks regions of spectral broadening.

An object of the invention is to provide a visual indicator of wind shear and turbulence.

Another object of the invention is to provide a visual indicator of wind shear and turbulence making real-time use of velocity information from weather echoes generated by a pulse Doppler radar.

The novel features that we consider characteristic of our invention are set forth with particularity in the appended claims. The invention itself, however, both as to its organization and its method of operation, together with additional objects and advantages thereof, will be understood from the following description of a specific embodiment thereof when read in connection with the accompanying drawings.

DESCRIPTION OF THE PREFERRED EMBODIMENT

To completely describe the present invention and its method of operation, the following theory is presented. A technique for providing real-time spectral analysis has been developed in recent years. This circuit is called a Coherent Memory Filter (CMF) or sometimes a Velocity Indicating Coherent Integrator (VICI). It has the capability of producing Doppler spectra at all ranges almost simultaneously.

Coherent signal energy reflected from a target during $N$ transmissions are added in phase. This in-phase addition yields a total signal energy which increases as successive signals are added. Since noise is added incoherently, there is a corresponding improvement in signal-to-noise ratio.

If $N$ successive pulses with zero Doppler shift, as reflected from a stationary target, are circulated in a delay line with a delay equal to the pulse repetition interval, $T$, and then added together they will produce an output with a peak $N$ times as great as the amplitude of the individual pulse. Coherent pulses reflected from a moving target, however, experience a phase shift, , due to the difference in path length during the time $T$ between successive pulses. A phase shift of $2\pi$ occurs when the distance from radar to target and return differs by one radar wavelength $\lambda$ during the interval $T$. For a target moving with radial velocity $v$, $$=4\pi vT/\lambda \quad (1)$$

It is obvious that successive pulses from moving targets delayed by $T$ will not be in phase and will not add. If moving targets are to be detected coherently, the phase of successive pulses must sweep from 0 to $2\pi$ during each pulse width, before entering the adder, so as to achieve the correct phase shift while a particular target is present at the adder. A linear time-varying phase shift is equivalent to a frequency shift; therefore, the compensating phase shifter can be replaced by a scanning frequency, $f_s$, with period equal to the pulse width, $\tau$ (i.e., $f_s=1/\tau$).

Figure 1:
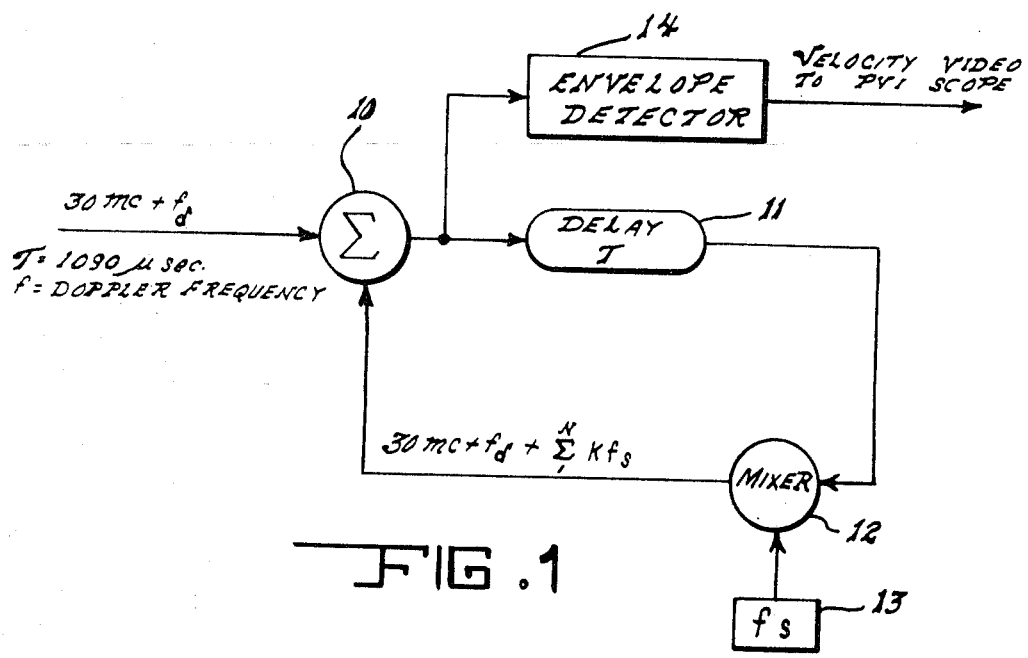
FIG. 1 shows a simplified block diagram of a coherent memory filter.

FIG. 1 shows a simplified block diagram of the CMF circuit. After a pulse has been circulated $N$ times by summer 10, delay 11, mixer 12 and oscillator 13, it will have been shifted up in frequency by $Nf_s$ and eventually will be rejected by the bandpass of the delay line. Since the circuit operates in the IF region, envelope detector 14 is needed to produce the velocity video.

When the target radial velocity produces a phase shift between successive pulses of $2\pi$ the output of the CMF appears as a zero velocity target. It can be seen from (1) that when $vT$ equals $\lambda/2$, the phase shift is $2\pi$. In the AFCRL (Air Force Cambridge Research Laboratory) Porcupine radar $T=1,090$ $\mu$sec and $\lambda=5.45$ cm. Substituting these into (1) and solving for $v$ when $=2\pi$ we get $v_{max}=25$ m/sec. Velocities in excess of 25 m/sec are displayed as the difference between the actual velocity and an integral multiple of 25 m/sec. Thus, our CMF can display unambiguous velocities up to 25 m/sec in every range bin. There are 191 range bins, each 5.7 $\mu$sec or 855 m. long, for a total range of 163 km.

Figure 2:
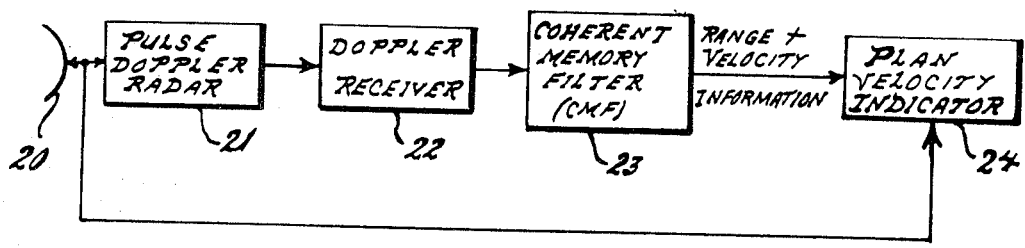
FIG. 2 shows a preferred embodiment of the invention in block diagram form.

In previous meteorological applications, the CMF output has been used to produce a pattern of range versus velocity (RVI scope) at a fixed antenna position, by a TV raster scan period of $\tau$ in one direction and $T$ at right angles to this direction. Now referring to FIG. 2, pulse Doppler radar 21 generates signals and as antenna 20 scans to provide weather echoes which are fed to Doppler receiver 22 and then to coherent memory filter (CMF) 23. Range and velocity information from coherent memory filter 23 is then provided to plan velocity indicator 24 for display on the face of the scope thereof. Thus the present invention employs a display of the coherent memory filter output on an ordinary PPI scope as the radar antenna scans. The antenna also supplies position information to the indicator. We have called this display a PVI scope (Plan Velocity Indicator) in order to distinguish it from the ordinary PPI map of echo positions. Where echo is present, a series of concentric, quasi-circular arcs is displayed, each one representing a 5.7 $\mu$sec range bin of the CMF. The width of each arc depends on the bandwidth of the CMF (equivalent to $1/N$ of the radar pulse width) and on the spectral width of the returned Doppler signal.

The output signal of the CMF, within each of the activated range bins, is displaced toward a greater range with increasing Doppler frequency. Ordinarily, 0 Doppler frequency (e.g., a fixed target) will appear at the beginning of the range bin in which the signal is detected, and the maximum unambiguous Doppler frequency will appear at the end of the range bin. The total CMF output, then, is a series of narrow signals, each one appearing at its appropriate range plus an increment corresponding to Doppler frequency. The indicated range of any CMF signal, $r_n$, is given by $$r_n = (c\tau/2)(n - v_n/v_{max}), \quad (2)$$

where $c$ is the speed of electromagnetic propagation, $n$ is an integer between 1 and $T/\tau$, $v_{max} = \lambda/2T$ is the maximum unambiguous velocity, and $v_n$ is the velocity at range $r_n$, reduced, if necessary, by an integral multiple of $v_{max}$ so that $v_n/v_{max} < 1$. Velocities are considered positive for motions directed away from the radar.

When the CMF output is displayed on the PVI scope as the radar antenna rotates, the pattern presented is a series of up to $T/\tau$ concentric arcs. If Doppler velocity were constant, as in observation of the ground, the arcs would be circular. If, however, radial shear is present the spacing between arcs would vary; and with the occurrence of tangential or azimuthal shear, the radius of an arc will vary with azimuth.

The distance $\Delta r$ between two successive arcs at a single azimuth is $$\Delta r = r_{n+} - r_n (c\tau/2)(1 - [v_{n+1} v_n]/v_{max}), \text{ or}$$
$$\Delta v = (c\tau/2 - \Delta r)(\lambda/c\tau). \quad (3)$$

If the y-axis of Cartesian coordinates is assumed to be identical with the direction in which the radar antenna points, $\Delta y$ between adjacent arcs is $c\tau/2$ and radial shear is given by $$dv/dy = (1 - 2\Delta r/c\tau)(\lambda/c\tau T). \quad (4)$$

The maximum value of $dv/dy$ which can be unambiguously measured is $\lambda/c\tau T$, occurring when $\Delta r$ approaches 0. With our particular radar and CMF, $\lambda = 5.45$ cm, $\tau = 5.7$ $\mu$sec, and $T = 1,090$ $\mu$sec, so $\lambda/c\tau T$ is about $3 \times 10^{12}$ sec$^{11}$. The bunching-up of arcs on the PVI scope indicates divergent radial shear and, conversely, larger than normal gaps between arcs indicate convergent radial shear.

Tangential shear of the radial velocity, with the radar beam directed along the y-axis, is defined by $dv/dx$ or $dv/y \, d\beta$, where $\beta$ is azimuth angle increasing with clockwise rotation. Tangential shear is a reliable indicator of vorticity and may often mark vigorous convective activity. Differentiation of (2) yields $$dv/dx = dv/y \, d\beta = -(\lambda/c\tau T) \, dr_n/r_n \, d\beta, \quad (5)$$

since, for any range beyond, say, $n = 10$, the fractional difference between $r_n$ and its corresponding true range, $y$, is quite small. Tangential shear contributing toward positive vorticity is indicated on the PVI scope by slope of an arc toward the radar, moving clockwise; and if the slope is as great as 45°, the magnitude of the shear will be $\lambda/c\tau T$, or about $3 \times 10^{12}$ sec$^{11}$ with our equipment.

The PVI scope not only has its use in rapid, easy recognition of large-scale radial and tangential shear, it may also be employed to identify regions of abnormal spectral broadening. When the radar is pointed more or less horizontally, such broadening, marked by thickened arcs on the PVI scope, would be indicative of considerable shear within the pulse volume and/or an unusual degree of turbulence.

Figure 3:
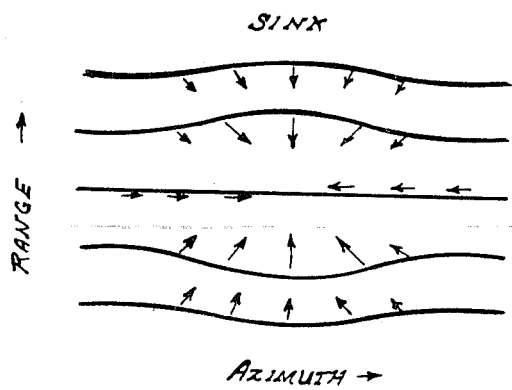
FIG. 3 shows a schematic plan velocity indicator scope pattern for convergent flow with arrow lengths representing wind speed.
Figure 4:
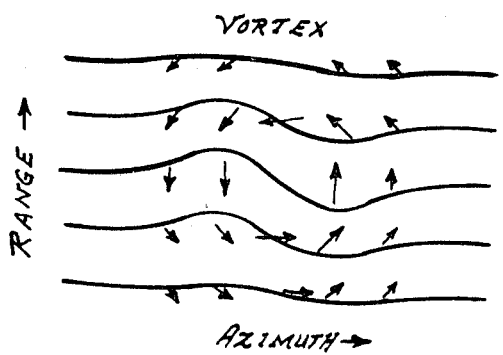
FIG. 4 shows a schematic plan velocity indicator scope pattern for cyclonic vortex.
Figure 5:
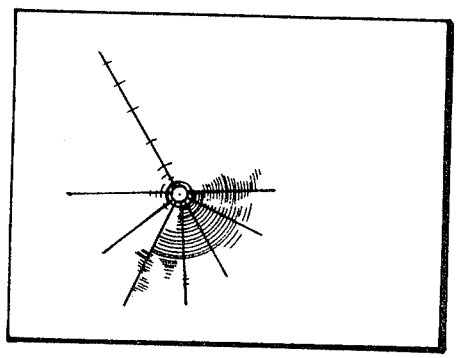
FIG. 5 shows a plan velocity scope display of a line of thunderstorms.

Schematic illustrations of the general appearance on the PVI scope of convergent flow and a vortex are illustrated in FIGS. 3 and 4. An example of data taken in a line of thunderstorms is reproduced in FIG. 5.

Signals entering the CMF are successively recirculated through its delay line and frequency shifter. The pass band of the delay line and its associated amplifiers shape the amplitude of the recirculated signals as their frequency continually increases from the low side of the pass band, through the peak, and into and beyond the high-frequency side. The pass band, therefore, weights amplitudes as a function of delay time, producing an envelope of signals leaving the delay line which resembles an antenna beam pattern. This weighting function effectively limits the number of recirculations through the delay line; for our instrument the number is 40.

Optimum data rates with the PVI scope are achieved by matching the antenna beam width of the scanning radar with the CMF delay line weighting function. At antenna scan rates in excess of optimum, the CMF will limit the angular resolution and will, in effect, act as an antenna spoiler. At slower scan rates than optimum, the rate of data acquisition will be unnecessarily low.

The half-power beam width $2\theta_o$ for an antenna used for both transmitting and receiving defines the aperture within which returned power is more than one-fourth of the maximum axial power. The number of recirculations, $N_o$, with output amplitude in excess of one-half of the maximum amplitude (or one-fourth the maximum power) defines the corresponding aperture of the CMF. At the optimum scanning rate $\beta_o'$, these two apertures are equivalent:

$$\beta_o' N_o T 2 \theta_o. \quad (6)$$

With our equipment $2\theta_o = 0.87°$, $T = 1,090$ $\mu$sec, and $N_o = 23$, so $\beta_o' = 35°$ per second, or 5.8 r.p.m. Since 20 recirculations are required to reach peak output amplitude in the delay line of our CMF, the output data will lag the input by 0.0218 sec. At the optimum scanning rate, this amounts to 0.76° rotation of the PVI pattern in the direction of antenna scan.

We may now compute the maximum data acquisition rate of the CMF. It is simply $T/\tau$ range cells per $N_o T$ seconds required for each beam width, or $1/N_o \tau$ pulse volumes per second. The rate for our CMF is $7.6 \times 10^3$ pulse volumes per second.

PVI display (or plan velocity indication) of radial and tangential gradients of Doppler velocity, as well as abnormal spectral broadening, has the advantages of very large data rates and convenient highlighting of the location and qualitative intensity of meteorologically significant velocity information in real time. These advantages are achieved at the cost of mediocre resolution of ranges and velocities and the inability to measure wind components quantitatively. The PVI display technique for a scanning Doppler radar uses an ordinary PPI scope intensity modulated by a coherent memory filter. The pattern is a series of concentric arcs, each one located on the scope at its appropriate range plus an incremental displacement dependent on the radial component of velocity measured at that range. Radial shear is indicated by gaps or bunching while tangential shear is indicated by wrinkles in the arcs. An increase in the line widths of the arcs marks regions of spectral broadening.

Although the invention has been described with reference to a particular embodiment, it sill be understood to those skilled in the art that the invention is capable of a variety of alternative embodiments within the spirit and scope of the appended claims.

We claim:

1. A pulse Doppler radar visual indicator of tangential shear and turbulence providing a characteristic signature comprising a pulsed Doppler radar having an antenna continuously scanning, said antenna directing pulses toward weather conditions of interest, a Doppler receiver receiving return weather echoes from said conditions of interest, a coherent memory filter receiving Doppler information from said Doppler radar receiver, said Doppler information containing velocity and range information, a plan velocity indicator receiving the output from said coherent memory filter for visual display on the face of said plan velocity indicator, said plan velocity indicator also receiving positional information from said antenna, said visual display being a pattern of concentric arcs, each arc being located at its appropriate range plus an incremental displacement dependent on the radial component of velocity measured at that range with radial shear indicated by gaps and bunching with tangential shear indicated by wrinkles in the arcs, an increase in line widths of the arcs marking regions of spectral broadening.

2. A pulse Doppler radar visual indicator as in claim 1 wherein said coherent memory filter is comprised of a summing network receiving the output of said radar receiver, a preselected delay connected to the output of said summing network, an oscillator generating a signal of predetermined frequency, a mixer simultaneously receiving the outputs of said delay and said oscillator, the resultant output of said mixer being received by said summing network, and an envelope detector receiving the output from said summing network to provide range and velocity information for intensity modulation of said plan velocity indicator.